Nov. 8, 1960 MEHMED YUSUF ALSO KNOWN AS 2,959,467
YUSUF M. BORVALI ET AL
PROCESS FOR TREATING ARSENIURETTED OR SULFARSENIDIC
COBALT, NICKEL OR COBALT AND NICKEL ORES
Filed March 22, 1956
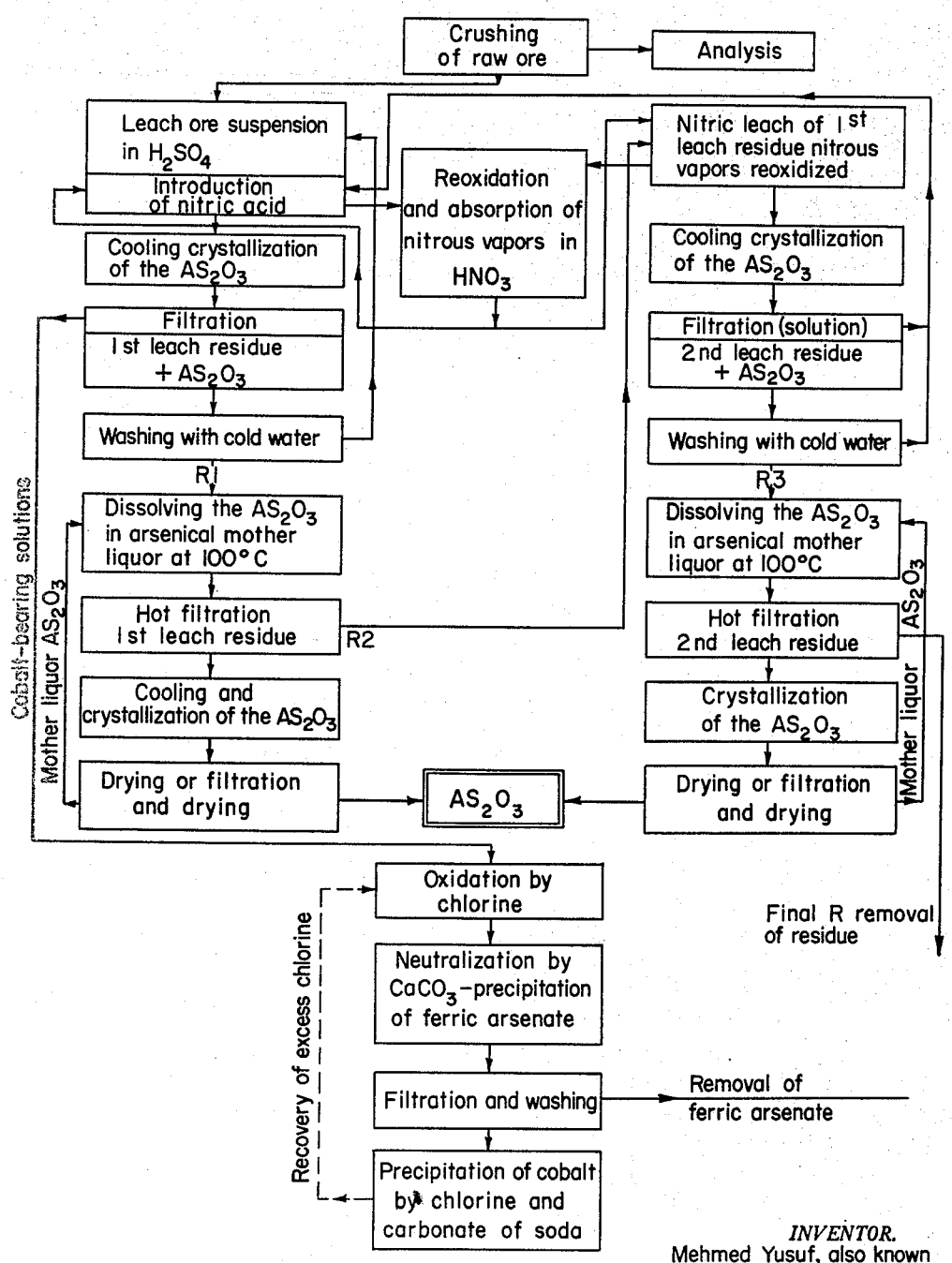
INVENTOR.
Mehmed Yusuf, also known
as Yusuf M. Borvali
BY Jean A. Etur
ATTORNEYS.

United States Patent Office

2,959,467
Patented Nov. 8, 1960

2,959,467

PROCESS FOR TREATING ARSENIURETTED OR SULFARSENIDIC COBALT, NICKEL OR COBALT AND NICKEL ORES

Mehmed Yusuf, also known as Yusuf M. Borvali, and Jean A. Etur, Petit-Quevilly, France Filed Mar. 22, 1956, Ser. No. 573,067

6 Claims. (Cl. 23—144)

Cobalt and/or nickel are generally extracted from arseniuretted or sulfarsenidic ores, in which they are found, by leaching these ores at industrially acceptable rates with an oxidizing acid to transform the metals into soluble salts and the arsenic into oxygenated compounds.

The difficulties encountered in these leaching methods, however, arise from the fact that a considerable amount of arsenic is found in these ores (up to 55 percent of the ore) and from the necessity of obtaining a leach solution having a fixed weight ratio of Fe/As as close to 1 as possible to permit later simultaneous elimination of these two elements without a supplementary addition of iron.

Frequently these ores must undergo expensive preliminary treatment by smelting to speiss or by an oxidizing roast to eliminate the greater part of the arsenic before the acid leach. The arsenic, however, is recovered by a hazardous operation in the form of arsenious acid anhydride of doubtful purity and of little market value.

If the raw ores are reacted with sulfuric acid alone, it is necessary to operate at a high temperature and to work with a large excess of acid of less than 98 percent strength. All the arsenic is then found in the form of arsenious acid anhydride in such quantity that the reaction product is not easily filterable. A part of this anhydride is entrained and causes serious disturbances in the equipment for neutralizing the released gases. Furthermore, neutralization of the excess of acid requires additional consumption of reagents and results in higher losses in solubilized metals. Finally, it is necessary to use a larger quantity of chlorine, an expensive reagent, to oxidize the arsenious anhydride corresponding to the iron.

Leaching with hydrochloric acid is usually done on an ore or speiss previously oxidized by roasting and in the presence of a strong oxidizing agent. All the arsenic remaining in the leached material is transformed into the arsenic ion.

Finally, if nitric acid alone is used without precautions, a considerable amount of the arsenic may form arsenic acid in an uncontrolled quantity which, if excessive, will necessitate the addition of iron to obtain simultaneous separation of the arsenic and of the iron in the form of ferric arsenate. Furthermore, the metals are combined in the form of nitrates, thus requiring additional expenditure of an expensive reagent.

Investigations by the applicants have led to the discovery of a complete process of wet-treating these raw ores or arseniuretted or sulfarsenidic materials containing cobalt and/or nickel which eliminates the above-mentioned disadvantages.

This process is based on a joint reaction by nitric acid and sulfuric acid under specific conditions. In such a reaction, the nitric acid acts almost exclusively as an oxidizing agent while the sulfuric acid acts as a solubilizing agent for the oxidized materials. In this sulfonitric reacting medium, the rate of oxidation of $As_2O_3$ to $As_2O_5$ is always low; it is possible, therefore, to determine by a preliminary calculation the proportion of arsenious anhydride to be oxidized to $As_2O_5$ in order to separate the iron and consequently to control the course of the reaction.

A previously prepared sulfonitric mixture may be used, or nitric acid may be used to induce oxidation and then sulfuric acid be added to decompose the nitrates, or, preferably, the sulfuric acid and the nitric acid may be caused to react simultaneously, thus obtaining a sulfonitric mixture having the desired characteristics.

It has been noted that the operation must be conducted in a medium which is sufficiently reducing to avoid an excess of nitric acid. Such excess might oxidize too large a part of the arsenious acid to arsenic acid which would be inconvenient for the remainder of the operations.

The process according to the invention is carried out in two stages: the first involves the sulfonitric mixture, this phase being controlled and deliberately limited to the solubilization of 80 to 85 percent of the elements introduced; the second involves the nitric acid alone which completes the reaction. This process makes possible:

(1) The solubilization of the metals to the form of sulfates with an extraction yield of more than 99.7 percent.

(2) A limited oxidation of the arsenic in the proportion necessary to precipitation in the form of ferric arsenate of all the iron present. It is known that this result is obtained when the weight ratio of Fe/As is between 0.8 and 1.2, and that under these conditions, adsorption of the cobalt sulfates and/or nickel sulfates by the ferric arsenate precipitate is at a minimum.

(3) The separation of the excess of arsenic in the form of crystallized arsenious acid anhydride of 99.5 to 99.8 percent purity produced in a pure, dense, and refined state.

(4) The recovery of more than 95 percent of the nitric acid used, which serves solely as a carrier for the oxygen and which will be reformed in a proper apparatus by air oxidation of the nitrous vapors released during the reaction.

The single figure of the drawing constitutes a simplified flowsheet illustrating steps in the operation of the process of the invention. Each step is represented schematically by a brief descriptive phrase in a bracket and the brackets are connected by arrows to show the successive order of carrying forth the steps. The process may be more fully understood by reference to the drawing and to the following detailed description of the method.

According to the preferred method of operation, the process is carried out in the following manner:

(1) The ore lot is carefully sampled and its composition is determined by analysis.

With the aid of this analysis, the following approximate calculations are made:

(a) The total amount of nitric acid which is required first, to oxidize all the arsenic (present as arsenides) to $As_2O_3$ (this reaction occurring preferentially to the following reaction); second, to change to $As_2O_5$ the amount of the $As_2O_3$ required to change the iron that will be in the form of a sulfate to ferric arsenic.

It should be noted that the nitric acid may vary in amount from 0 to 6 percent more or less than the calculated amount without the production of pentavalent As being substantially modified.

(b) The amount of sulfuric acid required: first, to form sulfates with all the metals that are present in the ore and are capable of forming soluble sulfates; second, to assure at the end of first reaction hereinafter defined a medium sufficiently acid (e.g., 30 to 40 grams of free $H_2SO_4$ per liter) to avoid any premature precipitation of the metals, particularly the iron.

(2) The ore, after being crushed and finely ground (preferably to at least a sieve size of 80 mesh; AFNOR module 24), is weighed and placed in suspension in the appropriate amount of sulfuric acid as previously determined and to which has been added the liquors from the last washing following the first leach of a preceding cycle of operation.

(3) The amount of nitric acid required in the first leach and the solutions from the second leach of the previous cycle are added, preferably continously as described infra. Thus there is obtained a regular release of nitrous vapors which are reoxidized and recovered in an appropriate apparatus wherein the nitric acid is reformed at a strength of about 53 percent and which may be recycled in the subsequent leaches.

The rate at which the nitric acid is added depends largely on the type of reaction apparatus used and on the capacity of the recovery installation.

It should be noted that regardless of the temperature of the pulp being reacted (a temperature which may easily reach 100° C.), the nitric acid oxidizes the arsenides preferentially, since the rate of oxidation of the arsenious anhydride in such a medium is always relatively low.

(4) The solid-liquid mass resulting from the reaction is either filtered hot or, preferably, left to cool to permit maximum crystallization of the $As_2O_3$. It is filtered and the cake is washed with cold water to eliminate the solubilized cobalt and/or nickel. The first wash liquors, rich in cobalt and/or nickel, are combined with the mother liquor. The subsequent wash liquors are recycled in the leaching step of the next cycle of operation.

The residue, $R_1$, from the filtration is put back in suspension in mother liquor from a preceding crystallization of $As_2O_3$ and the suspension is brought to the boiling temperature to assure the rapid dissolution of the $As_2O_3$ in the residue. It is hot filtered and the cake is washed with boiling water, combining the wash liquor and the pregnant solution which together contain about 80 grams of $As_2O_3$ per liter. This solution is then cooled, e.g., in a crystallizing apparatus supplied with agitators. This crystallization of the $As_2O_3$ can be accomplished in different media which modify the form that the crystallized $As_2O_3$ will take. As nonlimiting examples, the following media may be used: $H_2SO_4$; HCl; anionic wetting agents such as the mixtures of sulfonates of fatty secondary alcohols known under the name of "Teepol." These products may be employed singly or together for the purpose of reducing supersaturation and adherence of the $As_2O_3$ to the walls.

(5) The preceding residue, $R_2$, the $As_2O_3$ having been removed, contains unreacted ore (which may amount to 15 percent of the ore when ore initially ground to 80 mesh is used) and insoluble matter, silica in particular, from the reacted ore.

This residue is then subjected to the second hot leach with nitric acid alone.

As in the first reaction, a mixture of arsenic acid and arsenious anhydride is formed, and dissolution of the metals to the nitrate state takes place.

This mass is cooled in order to crystallize as much $As_2O_3$ as possible. It is filtered cold and the cake is washed with cold water to eliminate the dissolved cobalt and/or nickel.

The mother liquor and the wash water are then introduced in a continuous manner into the first leaching step of a succeeding cycle of operation, where the nitric acid of the nitrates will be displaced by the sulfuric acid present and will react immediately as an oxidation agent of the arsenides or sulfarsenides.

(6) The residue, $R_3$ of this second leach is treated with boiling water, filtered and washed with hot water under the same conditions as in the first reaction.

The $As_2O_3$ obtained from these solutions is of the same quality as the preceding $As_2O_3$.

The final residue, R, thus obtained contains only insoluble matter, in particular the silica from the ore and 0.2 to 0.3 percent of the coblat and/or nickel originally fed to the system.

(7) The solutions obtained from the first reaction are then treated to eliminate iron and arsenic.

The improved process, which is the object of the present invention, makes it possible to obtain superior products from this separation. This is made possible primarily by a precise regulation of the ratio of Fe/As and by the addition of anionic wetting agents such as "Teepol" which prevents local reactions of premature precipitation of the cobalt and/or nickel during subsequent neutralization of the solution.

The solutions obtained, which are deliberately kept slightly deficient in As to maintain a ratio of Fe/As between 0.8 and 1.2, are first adjusted by adding $As_2O_3$, either in a solid state, or by adding mother liquor from the crystallization of this product.

The iron and the arsenic are completely oxidized by a carefully distributed current of gaseous chlorine or by a hypochlorite.

Next is added a slurry of calcium carbonate to which an anionic wetting agent such as "Teepol" has been added.

When the acidity of the medium ($H_2SO_4$+HCl) falls below 0.1 N, the ferric arsenate precipitates. The pH is then measured. The addition of calcium carbonate is stopped when the pH is between 4 and 4.5. Under these conditions, all the iron and the As is precipitated and owing to the presence of the wetting agent, added either to the solution or the slurry of calcium carbonate, the ferric arsenate precipitate contains only 0.3 percent of the cobalt and/or nickel present in the solution. This precipitate is filtered and carefully washed.

(8) The solutions obtained are then sent on for the extraction of cobalt oxide.

(9) When chlorine is used for precipitation of the hydrated oxide of cobalt, a part of this gaseous chlorine is not utilized and escapes from the apparatus. This amount of chlorine which might otherwise be lost can be advantageously recovered in a column in which is circulated the sulfate solution produced in the first leach. The iron and the $As_2O_3$ in such solution will also be economically oxidized in this manner.

(10) The previously filtered solution from which the cobalt was removed is treated for the extraction of the nickel. It is first acidified by a small quantity of sulfuric acid, then neutralized by a cold solution saturated with $Na_2CO_3$. The presence of a large quantity of $CO_2$ maintains in solution the calcium oxide and the magnesium in the form of bicarbonates, and only the nickel carbonate precipitates.

After washing, this carbonate can be easily changed to commercial nickel sulfate.

An example of the process is outlined below:

1,000 kg. of ore of the following composition were treated:

| | Percent |
|---|---|
| Co+Ni | 10 |
| Fe | 8 |
| CaO | 2 |
| As | 50 |
| Insoluble | 20 |

In other words, the following were used:

| | Kg. |
|---|---|
| Co+Ni | 100 |
| Fe | 80 |
| CaO | 20 |
| As | 500 |
| Insoluble | 200 |

*First leach.*—The following were added to the leaching tank:

420 l. wash water from the second washing of the first leach residue ($R_1$) from the previous cycle of operation.
375 l. of $H_2SO_4$ at 53° Be., equivalent to 397 kg. of $H_2SO_4$ at 100 percent.
1000 kg. of ore ground to 80 mesh.

The following were then added in a slow, continuous manner over a period of 5 hours:

330 l. of the mixture of the mother liquor and the wash waters of the residue ($R_3$) from the second leach of the previous cycle of operation.
900 l. of $HNO_3$ at 36° Be., equivalent to 630 kg. of $HNO_3$, at 100 percent.

After the nitrous vapors escaped, 1,400 l. of clear solution containing the following was obtained:

$H_2SO_4$ (free) = 40 g./l., equivalent to a total of 56 kg.
Co+Ni = 71 g./l., equivalent to a total of 99.8 kg.
Fe = 56.1 g./l., equivalent to a total of 79.2 kg.
CaO = 2.1 g./l., equivalent to a total of 3 kg.
$As_5$ = 50.5 g./l., equivalent to a total of 70.5 kg.
$As_3$ = 10.7 g./l., equivalent to a total of 15 kg.

*Cold filtration.*—The residue was washed with 800 l. of cold water which was combined with the mother liquor to give 2,200 l. of solution containing:

Co+Ni = 45 g./l.          $As_5$ = 32 g./l.
Fe    = 36 g./l.          $As_3$ =  7 g./l.
CaO   = 1.35 g./l.        Total As = 39 g./l.

The residue ($R_1$) that remained on the filter was again washed with 420 l. of water. The wash solution obtained was utilized in the first leach step of the succeeding cycle of operation. The residue ($R_1$) contained:

Co+Ni = 15 kg.
Fe = 12 kg.
CaO = 18 kg.
As = 75 kg. (as arsenides)
As = 351.5 kg. in the form of $As_2O_3$
Insoluble = 200 kg.

The $As_2O_3$ was dissolved with 10 m.$^3$ of hot mother liquor from the crystallization of $As_2O_3$ from the preceding operations.

After filtration and cooling, the following were obtained:

A residue ($R_2$) from which the $As_2O_3$ had been removed. 467.5 kg. of crystallized $As_2O_3$.

*Second leach.*—The preceding residue ($R_2$) was leached hot with 300 l. of $HNO_3$ at 36° Be., equivalent to 210 kg. of $HNO_3$ at 100 percent.

After cooling the following was obtained:

200 l. of clear solution and a residue ($R_3$).

This residue ($R_3$) was filtered and thoroughly washed with cold water, which produced together with the clear solution, 330 l. of a nitrate solution containing:

Co+Ni = 45 g./l. or 14.8 kg.
Fe = 34 g./l. or 11.2 kg.
CaO = 3 g./l. or 1 kg.
$As_5$ = 30 g./l. or 10 kg.
$As_3$ = 3 g./l. or 2 kg.
Total As = 36 g./l. or 12 kg.
$HNO_3$ = 250 g./l. or 84 kg.

This solution was sent to the first leaching step of the subsequent cycle of operation.

The residue ($R_3$) containing 62 kg. of As in the form of $As_2O_3$ was treated at boiling temperatures by 1.65 m.$^3$ of mother liquor from the crystallization step.

After hot filtration, the crystallization gave 80 kg. of dry crystallized $As_2O_3$.

The final residue weighing 250 kg. contained:

Co+Ni = 0.08% or 0.2% of Co used
Fe = 0.32% or 0.8% of Fe used
As = 0.16% or 0.4% as used In brief, this treatment of 1,000 kg. of ore required:
600 kg. of $H_2SO_4$ at 53° Be., equivalent to 397 kg. of $H_2SO_4$ at 100 percent.
1,000 kg. of $HNO_3$ at 36° Be., equivalent to 840 kg. of $HNO_3$ at 100 percent.

and yielded:

(1) A solution containing:

Co+Ni = 99.8 kg., or 99.8% solubilization
Fe = 79.2 kg.
$As_5$ = 70.5 kg.  } representing 17% of the As used.
$As_3$ = 15 kg.

(2) A final residue weighing:

250 kg. and containing only 0.2% of the cobalt used.

(3) 547.5 kg. of crystallized $As_2O_3$ of 99.5 to 99.8 percent purity.

In summary, the process for treating arseniuretted or sulfarsenidic cobalt and/or nickel ores which forms the object of the present invention is based on the leaching of these ores in two stages: first, the sulfonitric leach, controlled and intentionally limited; second, the nitric acid leach. The combination of these two stages makes it possible, among other things, to obtain, in addition to a yield of more than 99.7 percent from the solubilization of the metals present in the ore, a recovery of the larger part of the arsenic in crystallized form.

What is claimed is:

1. In a two-stage, wet-treatment, acidic-oxidation process for extraction of a metal value selected from the group consisting of cobalt, nickel, and mixtures thereof from raw ore containing iron and the metal value in association with arsenic, the recovery of arsenic as $As_2O_3$ by the combination of steps of: in the first stage, contacting pulverized ore with aqueous sulfuric and nitric acid solutions, thus forming a pulp consisting of solids and an aqueous liquor containing a water soluble sulfate of the metal value, said nitric acid being employed in about the stoichiometric amount to oxidize all of the arsenic in said ore to $As_2O_3$, said sulfuric acid being employed in an amout to convert the metal value in said ore to the water soluble sulfate and to provide a free sulfuric acid concentration in the aqueous liquor; filitering the pulp at about ambient temperature to separate the aqueous liquor from the solids; leaching said solids with water of about boiling temperature and filtering at about boiling temperature to separate a residue from an aqueous leach solution containing $As_2O_3$; in the second stage, contacting said residue with aqueous nitric acid, thus forming a solid-liquid mass consisting of a liquid portion and a solid portion; filtering the solid-liquid mass at about ambient temperature to separate the liquid portion from the solid portion; leaching the solid portion with water of about boiling temperature and filtering at about boiling temperature to separate a leach liquor containing $As_2O_3$ from an ore residue substantially free from the metal value and arsenic; and cooling to crystallize $As_2O_3$ and separating the crystallized $As_2O_3$ from the leach solution and the leach liquor.

2. The process of claim 1 in which nitrous vapors arising from the contacting of said ore with the aqueous nitric acid solution and from the contacting of said residue with nitric acid are collected, oxidized to nitric acid, and recycled to contact said ore and said residue; in which the liquid portion separated from said solid-liquid mass in the second stage of the process contains a nitrate of the metal value; in which said liquid portion containing the nitrate of the metal value circulates and contacts the pulverized ore along with said aqueous sulfuric and nitric acid solutions in the first stage of the process to form said pulp; and in which the metal value is recovered from the aqueous liquor of the first stage of the process containing the sulfate of the metal value by treating said aqueous liquor to remove iron and arsenic as ferric arsenate and, after removal of the iron arsenate, by treating the aqueous liquor to precipitate the cobalt metal value as cobalt oxide and the nickel metal value as nickel carbonate.

3. The process of claim 2 in which the water for leaching said solids in the first stage of the process is an aqueous mother liquor from which $As_2O_3$ has been precipitated and in which the water for leaching said solid portion in the second stage of the process is an aqueous mother liquor from which $As_2O_3$ has been precipitated.

4. A two-stage, wet-treatment, acidic-oxidation process of extracting a metal value selected from the group consisting of cobalt, nickel, and mixtures thereof from raw ore containing iron and the metal value in association with arsenic, comprising: in the first stage, contacting pulverized ore with aqueous sulfuric and nitric acid solutions, thus forming a pulp consisting of solids and an aqueous liquor containing a sulfate of the metal value, said nitric acid being employed within 6 percent of the stoichiometric amount to oxidize all of the arsenic in said ore to $As_2O_3$ and to oxidize a portion of the $As_2O_3$ to the stoichiometric amount of $As_2O_5$ to convert all iron in said ore to ferric arsenate, said sulfuric acid being employed in an amount to convert the metal value in said ore to the metal sulfate and to provide a free sulfuric acid concentration in the aqueous liquor sufficient to avoid precipitation of the metal sulfate at ambient temperature; filtering the pulp at about ambient temperature to separate the aqueous liquor from the solids; washing the solids at about ambient temperature with a first wash water and combining the first wash water with the aqueous liquor; washing the solids at about ambient temperature with a second wash water and circulating the second wash water to contact the pulp; leaching the solids with a mother liquor of about boiling temperature from which $As_2O_3$ crystals have been precipitated and filtering at about boiling temperature a residue from an aqueous leach solution enriched in $As_2O_3$; cooling to crystallize $As_2O_3$ and separating the crystallized $As_2O_3$ from the aqueous leach solution; in the second stage, contacting the residue with aqueous nitric acid, thus forming a solid-liquid mass consisting of a solid portion and a liquid portion containing a nitrate of the metal value; collecting nitrous vapors arising from contacting said ore with the aqueous nitric acid solution and from contacting said residue with aqueous nitric acid; oxidizing the collected nitrous vapors to nitric acid for reuse in the process; filtering the solid-liquid mass at about ambient temperature to separate the liquid portion from the solid portion; washing the solid portion at about ambient temperature with a wash water and combining the wash water with the liquid portion; circulating the combined wash water and liquid portion to contact the pulp; leaching the solid portion with a mother liquor of about boiling temperature from which $As_2O_3$ crystals have been precipitated and filtering at about boiling temperature to separate a leach liquor enriched in $As_2O_3$ from an ore residue substantially free from the metal value, arsenic, and iron; cooling to crystallize $As_2O_3$ and separating the crystallized $As_2O_3$ from the leach liquor; and treating the combined first wash water and aqueous liquor to precipitate and filter off the cobalt metal value as cobalt oxide and the nickel metal value as nickel carbonate.

5. The process of claim 4 in which the treating of the combined first wash water and aqueous liquid, prior to precipitating and filtering off of the cobalt and nickel metal values, includes oxidizing iron and arsenic in the combined first wash water and aqueous liquor and then adding a minor amount of an anionic wetting agent and adjusting the free sulfuric acid concentration in the combined first wash water and aqueous liquor to less than 0.1 N to precipitate ferric arsenate.

6. A two-stage, wet-treatment, acidic-oxidation process of extracting a metal value selected from the group consisting of cobalt, nickel, and mixtures thereof from raw ore containing iron and the metal value in association with arsenic, comprising: in the first stage, forming a pulp consisting of solids and an aqueous liquor containing a sulfate of the metal value by contacting pulverized ore with aqueous sulfuric and nitric acid, with a second wash water from a first stage of operation of the process, and with a combined wash water and liquid portion from a second stage of operation of the process, said nitric acid being employed within 6 percent of the stoichiometric amount to oxidize all of the arsenic in said ore to $As_2O_3$ and to oxidize a portion of the $As_2O_3$ to an amount of $As_2O_5$ having a ratio by weight of arsenic to the iron in said ore from 0.8:1 to 1.2:1, said sulfuric acid being employed in an amount to convert the metal value in said ore to the metal sulfate and to provide a free sulfuric acid concentration of 30 to 40 grams per liter of the aqueous liquor; collecting nitrous vapors arising from the contacting of said ore with the aqueous nitric acid solution; oxidizing the collected nitrous vapors to nitric acid and recycling to contact said ore; filtering the pulp at about ambient temperature to separate the aqueous liquor from the solids; washing the solids at about ambient temperature with a first wash water and combining the first wash water with the aqueous liquor; washing the solids at about ambient temperature with a second wash water and employing the second wash water in a first stage of operation of the process; leaching the solids with a mother liquor of about boiling temperature from which $As_2O_3$ crystals have been precipitated and filtering at about boiling temperature to separate a residue from an aqueous leach solution enriched in $As_2O_3$; cooling to crystallize $As_2O_3$ and filtering the crystallized $As_2O_3$ from the aqueous leach solution; in the second stage, forming a solid-liquid mass consisting of a solid portion and a liquid portion containing a nitrate of the metal value by contacting the residue with aqueous nitric acid; collecting nitrous vapors arising from the contacting of the residue with the aqueous nitric acid; oxidizing the collected nitrous vapors to nitric acid and recycling to contact said residue; filtering the solid-liquid mass at about ambient temperature to separate the liquid portion from the solid portion; washing the solid portion at about ambient temperature with a wash water; combining the wash water with the liquid portion and employing the combined wash water and liquid portion in a first stage of operation of the process; leaching the solid portion with a mother liquor of about boiling temperature from which $As_2O_3$ crystals have been precipitated and filtering at about boiling temperature to separate a leach liquor enriched in $As_2O_3$ from an ore residue substantially free from the metal value, arsenic, and iron; cooling to crystallize $As_2O_3$ and filtering the crystallized $As_2O_3$ from the leach liquor; adding a neutralizing agent containing a minor amount of an anionic wetting agent to the combined first wash water and aqueous liquor of the first stage of the process in an amount to provide a pH between 4 to 4.5 and to form a ferric arsenate precipitate; filtering off the ferric arsenate precipitate; and recovering the metal value by precipitating and filtering off the cobalt metal value as cobalt oxide and the nickel metal value as nickel carbonate from the solution from the addition of the neutralizing agent to the combined first wash water and aqueous liquor after the removal of the ferric arsenate precipitate.

References Cited in the file of this patent

UNITED STATES PATENTS

| | | |
|---|---|---|
| 1,447,203 | Ellis et al. | Mar. 6, 1923 |
| 1,512,733 | Wescott | Oct. 21, 1924 |
| 1,863,807 | Schopper | June 21, 1932 |
| 1,992,053 | Boller | Feb. 19, 1935 |
| 2,686,114 | McGauley et al. | Aug. 10, 1954 |
| 2,805,936 | Schaufelberger | Sept. 10, 1957 |

UNITED STATES PATENT OFFICE
CERTIFICATION OF CORRECTION

Patent No. 2,959,467            November 8, 1960

Mehmed Yusuf et al.

It is hereby certified that error appears in the above numbered patent requiring correction and that the said Letters Patent should read as corrected below.

Column 2, line 58, for "arsenic" read -- arsenate --; column 6, line 41, for "filiter" read -- filter --; column 7, line 33, after "temperature" insert -- to separate --.

Signed and sealed this 25th day of April 1961.

(SEAL)
Attest:

ERNEST W. SWIDER
Attesting Officer

DAVID L. LADD
Commissioner of Patents